Oct. 9, 1962 R. A. STOLLE ET AL 3,057,969

SOUND DELAY REVERBERATION EFFECT

Filed Aug. 3, 1959 2 Sheets-Sheet 1

INVENTORS
RAYMOND A. STOLLE
EDDIE S. TUBIN
BY C. G. Stratton
ATTORNEY

SOUND DELAY REVERBERATION EFFECT

INVENTORS
RAYMOND A. STOLLE
EDDIE S. TUBIN
BY C. G. Stratton
ATTORNEY

United States Patent Office 3,057,969
Patented Oct. 9, 1962

3,057,969
SOUND DELAY REVERBERATION EFFECT

Raymond A. Stolle, Inglewood, and Eddie S. Tubin, Los Angeles, Calif.; said Raymond A. Stolle assignor to said Eddie S. Tubin Filed Aug. 3, 1959, Ser. No. 831,202
2 Claims. (Cl. 179—100.2)

This invention relates to a variable delay tape recorder and deals with an electromechanical device in which sound is reproduced in a realistic manner. Such realistic reproduction is frequently referred to as depth, presence, and/or stereophonic. The invention also deals with an electromechanical device for producing echoes of sound recordings and generally incorporates a recording and playback system together with means to provide a variable delay between recording and playback.

The present invention comprises a simplification and improvement of application Serial No. 797,520 filed March 5, 1959, in the name of Raymond A. Stolle, one of the present inventors, and entitled "Electrical Sound Delaying Device."

The invention contemplates the provision of a sound delay device that produces a stereophonic sound effect, but in which the acoustical background is adapted to be simulated and changed according to the desires of the listener.

The electrical signals which are recorded by the present means may be obtained across the speaker terminals of any conventional monaural sound system, detecting the recorded signal with a playback head located immediately beyond a recording head, providing for movability or adjustment of the position of such playback head, so the same has a spacing that may be varied with respect to a recording head so as to achieve a desired time delay between the input and the output signals of the device. Such induced delay of the original signal, emanating from a separate speaker, is heard simultaneously with the signal emanating from the original speaker, thereby producing a stereophonic effect from any monaural source as above indicated. The invention, which is characterized by novel variable delay adjustment means capable of accurate calibration in micro-seconds, comprises a means having a wide variety of uses such as in recording echoes and stereophonic effects for tapes and records.

An object of the present invention is to provide a device of the character referred to that is compactly and inexpensively constructed and which includes novel and simplified means for varying the delay of the echo, as desired.

Another object of the invention is to provide an echo-producing device that has its compactness largely the result of a novel tape-storing spool or cartridge that combines with novel delay-adjusting means aforementioned.

A further object of the invention is to provide a device of the character indicated that has a positive and non-slipping drive for the record tape thereof, thereby insuring not only against bending but also against slippage such as frequently results from use of lubricants on the tape.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 6 is an enlarged plan sectional view of the parts in another operative position, the same showing the position of maximum time delay.

Figure 1:
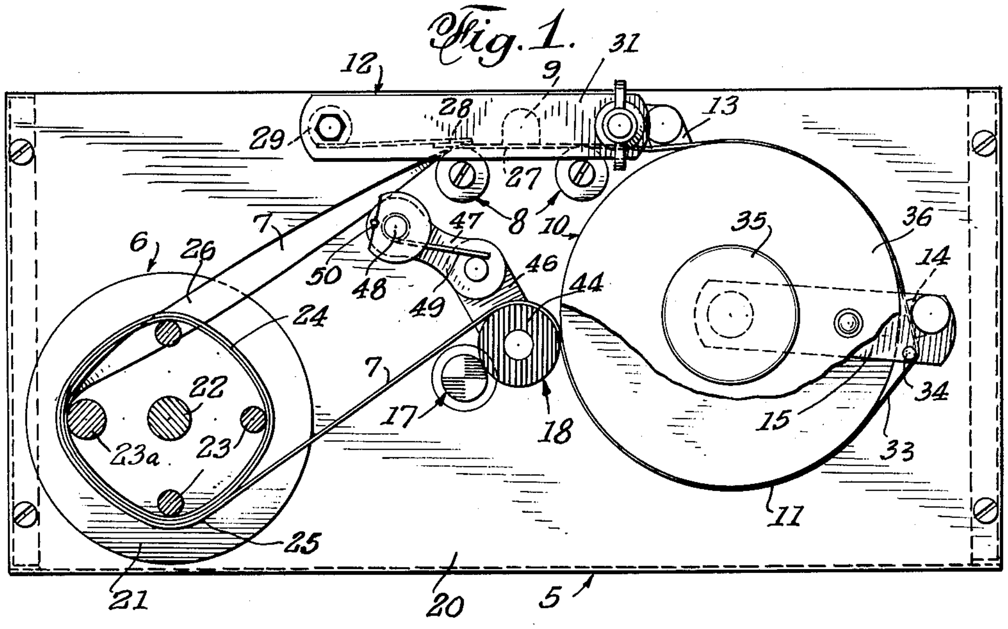
FIG. 1 is partly broken plan view of an echo-producing device according to the present invention.

It will be understood that the electrical components, such as input and output amplifiers, the speakers of radio, or phonograph devices are connected to the present device in the ordinary way. The teachings in said pending application are exemplary thereof and such connections will be described in the course of the following specification.

The present device comprises, generally, a support base 5 that is interiorly hollow and which may house, if desired, amplifiers and the like, a tape cartridge 6 mounted on said base and constituting a pay-out and take-up means for an endless magnetic tape 7, tape guides 8 over which the tape is moved so as to guide the tape in a path operatively associated with a conventional erase head 9, a drum 10 around which the tape 7 is wrapped to form bight 11, a bracket 12 in the base 5, a record head 13 carried by the bracket and in reproducing engagement with the tape in advance of the beginning of the bight 11, a playback head 14 in reproducing engagement with the tape beyond where the head 13 engages the tape, an arm 15 mounting said head 14 and swingable around the center of rotation of the drum 10 to adjust the mechanical spacing of head 14 relative to the head 13, an electric motor 16 carried by and disposed within the hollow of base 5, a capstan 17 driven by said motor, and means 18 over which the tape is trained and biased to a position between said capstan and the bight 11 to drive the tape in a steady and continuous manner.

The base 5 is shown as a rectangular housing having a top wall 20 which, in this instance, supports all of the elements of the present mechanism, either on top or within the hollow of the base.

Figure 2:
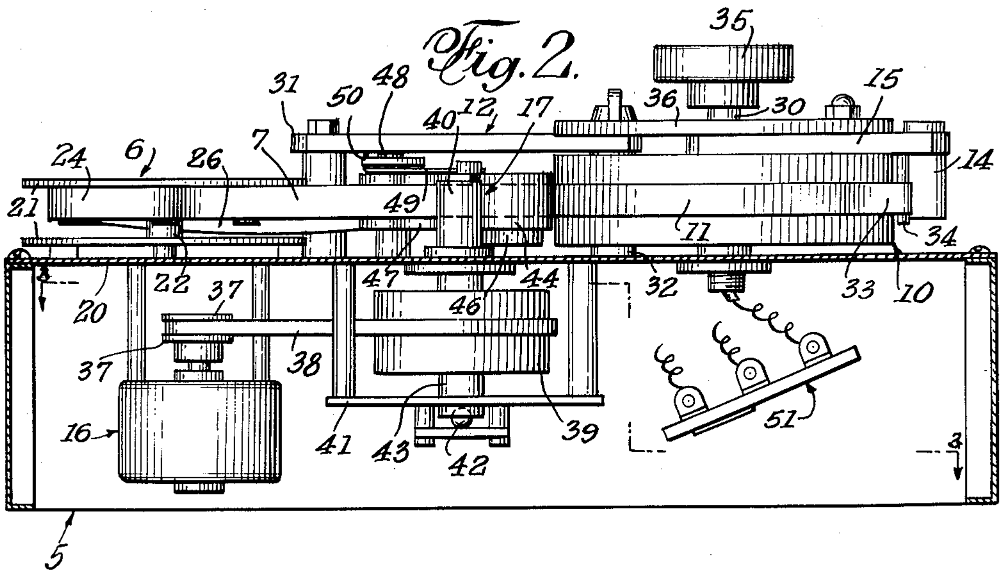
FIG. 2 is a front elevational view thereof with the front wall of a support base removed.
Figure 3:
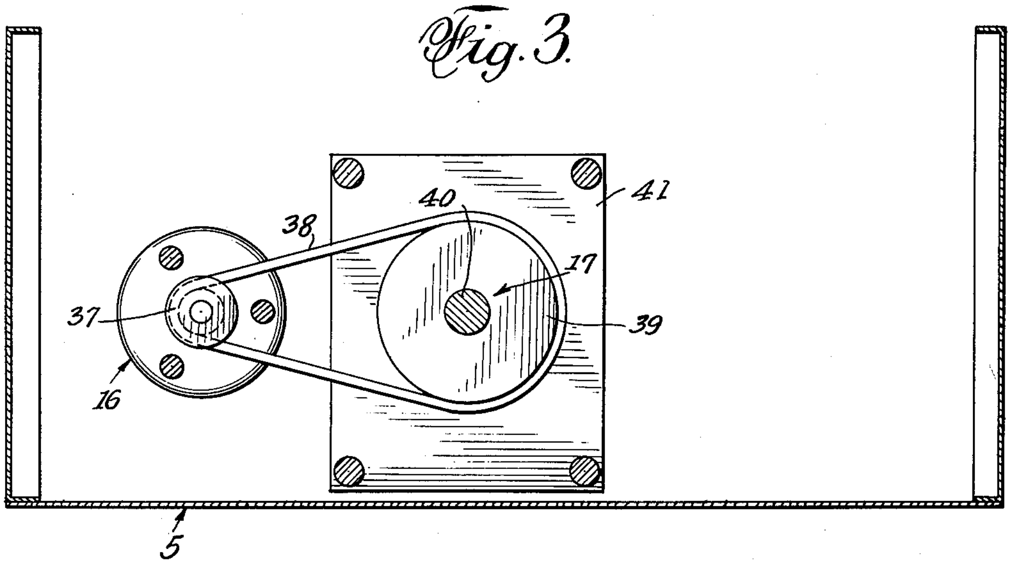
FIG. 3 is a plan sectional view as taken on the line 3—3 of FIG. 2.
Figure 4:
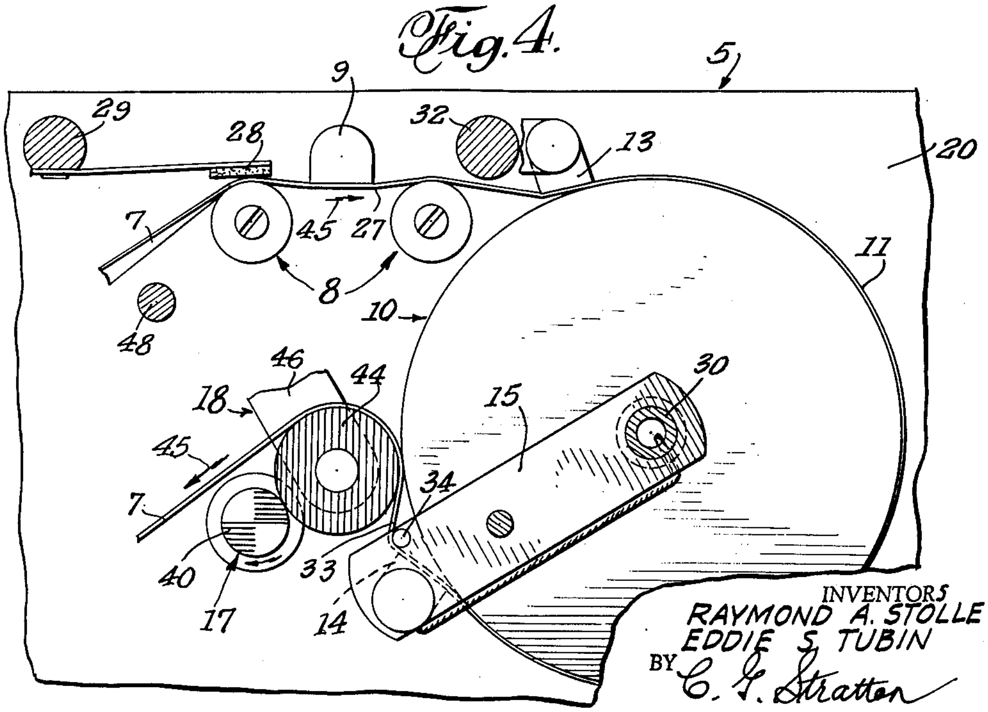

The tape cartridge 6 comprises a pair of flanges 21 connected by a central stud 22. Said flanges are fixed and the upper one carries a plurality of studs or rollers 23 around which is wound a supply or reel 24 of tape 7 in a manner that the tape feeds onto the supply or reel on the outside at 25 and pays out, accordingly, from the inside after passing around the stud or roller 23*a*. It will be noted from FIG. 2 that the spacing of the flanges 21 is such as to allow the pay-out run 26 of the reel to pass between the reel and the lower flange 21.

The tape 7 is endless, as will be clear, and quite convention of magnetic tapes that record sound by magnetic induction.

The tape guides 8 are shown as a pair of spaced rollers over which the run 26 is trained to provide a run 27 that is engaged by the erase head 9. The latter, as is usual, may be arranged to operate or not, as desired. It is preferred to apply a light but steady pressure on the tape as it forms the bight 27. To this end a felt-padded spring 28, carried by a post 29, is provided to press the tape against the near roller of the guides 8.

The drum 10 is mounted to rotate freely on a hollow axle 30. Said drum is preferably of such diametral size that a substantial length of tape 7 may be wrapped therearound, as shown. The tape has a flatwise contact with the drum, in the manner shown, to form the mentioned bight 11, and it will be seen that said bight has substantial frictional contact with the drum periphery to provide a non-slipping engagement of drum and tape.

The bracket 12 comprises a plate 31 carried by the post 29 and by a similar post 32 disposed beyond the end of the tape run 27. Said plate 31 carries the record head 13, and may be swung out on the post 29 to allow threading of the tape, as shown.

The playback head 14 is carried on the end of arm 15, the same having recording engagement with a catenary 33 formed in the bight 11 by a pin 34 depending from the arm 15. Said catenary, of course, spaces the tape from the drum periphery so that the playback head may have a resilient contact with the tape in much the same way that the heads 9 and 13 have contact with the tape. It will be seen that said arm 15 may be swung around the axle 30 to vary the spacing between the fixed record head 13 and the playback head 14 on said arm. Such adjustment may be effected by means of a knob 35 that is affixed to the arm 15. In this case, a plate 36 is affixed to arm 15 and the knob is affixed to said plate. Any magnetic recording on the tape 7 is first picked up by the head 13 and, then, in timed sequence according to the angular space between the heads 13 and 14, by the latter head.

The motor 16 is provided with a drive pulley 37 around which is trained a belt 38.

The capstan 17 is shown as comprising a flywheel 39 that is driven by said belt and a friction drive arbor 40 that extends through the base wall 20 on an axis parallel to the axis of the drum 10. Said capstan is supported on a frame 41 for free rotation, a thrust bearing 42 being interposed between the axle 43 of the capstan and the frame 41. It will be evident that the mass of flywheel 39 imparts a uniform rotation to the arbor 40, the inertia forces thereof smoothing out any unevenness that there may be in the resistance or drag on the tape 7 as the same is being moved. Thus, extraneous "wow" sounds in the reproduction are largely eliminated.

The tape-driving means 18 comprises a preferably resilient roller 44 over which the tape 7 is trained as the same leaves the drum 10 and which is interposed between the capstan arbor 40 and the drum in a manner whereby the arbor 40 imparts rotation to the roller and the latter, by its frictional contact with the tape, pulls the latter in the direction of the arrows 45. Because of the extensive contact between the tape and drum 10, the latter is driven. As a consequence, the strain on the tape is largely eliminated as the frictional grip with the drum feeds the same in the direction indicated.

The means 18 is formed such that the roller 44 is lightly biased in a direction toward its drive position. To this end, said roller is carried on the end of a link 46 that is, pivotally carried by an arm 47 on a stud 48. The bias is created by a light spring 49 that may be tension-adjusted by means 50 on the stud 48. Although the force of spring 49 is light, it yet insures that the roller 44 is biased to its drive position, as shown. Since the biasing force is light, any tendency for the roller 44 to develop "flats" during periods of rest are largely obviated.

It will be evident from the foregoing that recordings on the tape are picked up successively by the heads 13 and 14 at any desired time delay according to the adjustment of head 14, as described.

The bank of terminals 51 represent means for connecting the heads 9, 13 and 14 to suitable electronic components which energize them and cause them to carry out their function—either erasing (head 9), recording (head 13) or playing back or echoing (head 14).

While the foregoing specification illustrates and describes what we now contemplate to be the best mode of carrying out our invention, the construction is, of course, subject to modification without departing from the spirit and scope of our invention. Therefore, we do not desire to restrict the invention to the particular form of construction illustrated and described, but desire to cover all modifications that may fall within the scope of the appended claims.

Having thus described our invention, what we claim and desire to secure by Letters Patent is:

1. An echo-producing device comprising a drum having a magnetic recording tape partly wrapped therearound to form a bight in said tape, a record head operatively engaged with said tape, a playback head operatively engaged with the bight portion of the tape, means mounting the playback head for angular adjustment around the drum for varying the spaced relationship between the heads, means carried by the mentioned head-carrying means to engage and form a catenary in the tape bight and which is spaced from the periphery of the drum, the playback head being engaged with said catenary in the tape bight, and means to drive the tape in a direction so that a recording thereon first passes the record head and then the playback head in delayed sequence according to said angular adjustment.

2. An echo-producing device according to claim 1 in which both the playback head and the catenary-forming means are mounted against relative movement and are both adjustable together around the periphery of the drum.

References Cited in the file of this patent

UNITED STATES PATENTS

| | | |
|---|---|---|
| 2,105,318 | Goldsmith | Jan. 11, 1938 |
| 2,561,698 | Hogan | July 24, 1951 |
| 2,718,561 | Flata et al. | Sept. 20, 1955 |
| 2,804,499 | Butts | Aug. 27, 1957 |
| 2,831,069 | Snow | Apr. 27, 1958 |